(12) United States Patent
Iwama et al.

(10) Patent No.: US 9,587,696 B2
(45) Date of Patent: Mar. 7, 2017

(54) DRY FRICTION MATERIAL AND METHOD FOR MANUFACTURING THE SAME

(75) Inventors: Kiyoshi Iwama, Toyota (JP); Hideo Ono, Toyota (JP); Kazuya Morita, Toyota (JP)

(73) Assignee: AISIN KAKO KABUSHIKI KAISHA, Aichi-ken (JP)

(*) Notice: Subject to any disclaimer, the term of this patent is extended or adjusted under 35 U.S.C. 154(b) by 473 days.

(21) Appl. No.: 13/812,283

(22) PCT Filed: Apr. 15, 2011

(86) PCT No.: PCT/JP2011/059333
§ 371 (c)(1),
(2), (4) Date: Mar. 25, 2013

(87) PCT Pub. No.: WO2012/014535
PCT Pub. Date: Feb. 2, 2012

(65) Prior Publication Data
US 2013/0183478 A1    Jul. 18, 2013

(30) Foreign Application Priority Data

Jul. 27, 2010 (JP) .................... 2010-168090

(51) Int. Cl.
F16D 69/02 (2006.01)
F16D 13/64 (2006.01)
F16D 69/00 (2006.01)

(52) U.S. Cl.
CPC ........... *F16D 69/026* (2013.01); *F16D 13/64* (2013.01); *F16D 69/00* (2013.01);
(Continued)

(58) Field of Classification Search
CPC ........ F16D 13/64; F16D 69/00; F16D 69/026; F16D 2200/0065; F16D 2300/10; F16D 2069/004; Y10T 428/213
(Continued)

(56) References Cited

U.S. PATENT DOCUMENTS 5,308,392 A * 5/1994 Morita et al. ................... 106/36
2009/0053502 A1 2/2009 Spandern
2010/0294615 A1* 11/2010 Runge et al. ............ 192/107 M

FOREIGN PATENT DOCUMENTS

JP 04-131522 A 5/1992
JP 2000-037797 A 2/2000
(Continued)

*Primary Examiner* — Maria Veronica Ewald
*Assistant Examiner* — Brian Handville
(74) *Attorney, Agent, or Firm* — Sughrue Mion, PLLC; Richard C. Turner

(57) ABSTRACT

In a dry friction material and a method for manufacturing the same, to maintain a content of glass fibers low on a whole dry friction material to apply a hole boring for caulking assembly with high strength and high stiffness at a part to be subjected to the hole boring.
A part (glass-rich part 30) to be subjected to the hole boring is pressed at a higher pressure than a part not to be subjected to the hole boring in a press-shaping step by providing a rib 21 protruding toward a shaped body side on a part of press dies 20A, 20B corresponding to the part to be subjected to the hole boring. Thereby, only a compounded rubber 4 is pushed outward and only the glass-rich part 30 has an increase in a content of glass fibers 3. Thereby, strength that can withstand the hole boring is obtained. Accordingly, a dry friction material 1 with a bored hole 2 bored without generating a failure in the hole boring can be manufactured.

7 Claims, 10 Drawing Sheets

(52) U.S. Cl.
CPC .............. *F16D 2069/004* (2013.01); *F16D 2200/0065* (2013.01); *F16D 2300/10* (2013.01); *Y10T 428/213* (2015.01)

(58) Field of Classification Search
USPC ..................................... 428/66.2; 156/228
See application file for complete search history.

(56) References Cited

FOREIGN PATENT DOCUMENTS

| | | |
|---|---|---|
| JP | 2003-083374 A | 3/2003 |
| JP | 2004-182911 A | 7/2004 |
| JP | 2005-249032 A | 9/2005 |
| JP | 2009-534590 A | 9/2009 |

\* cited by examiner

F I G. 1
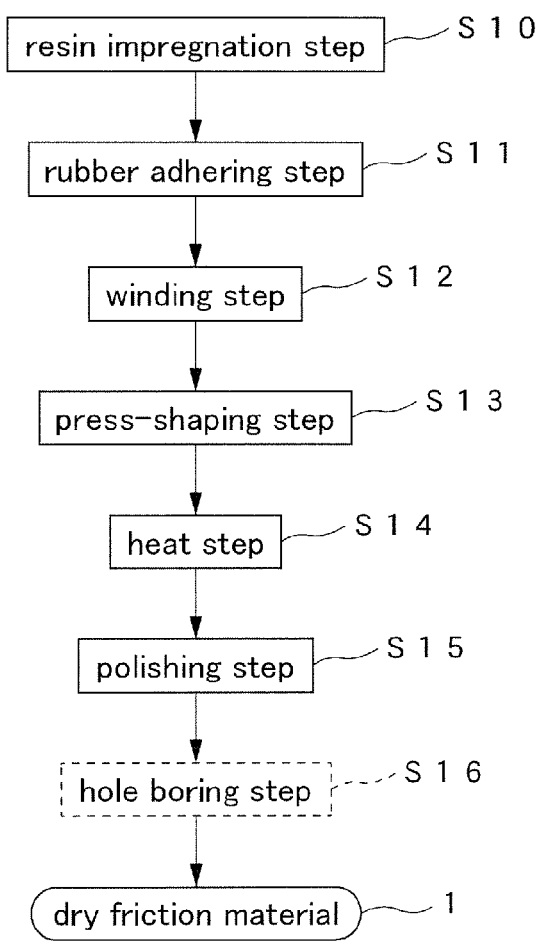

F I G. 8
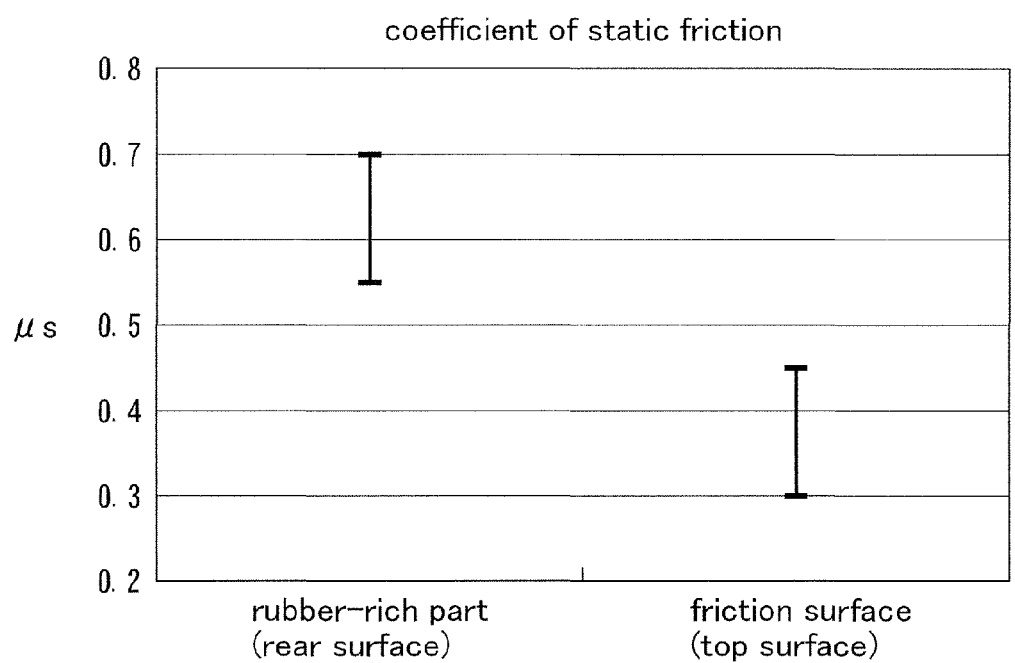

F I G. 9 A
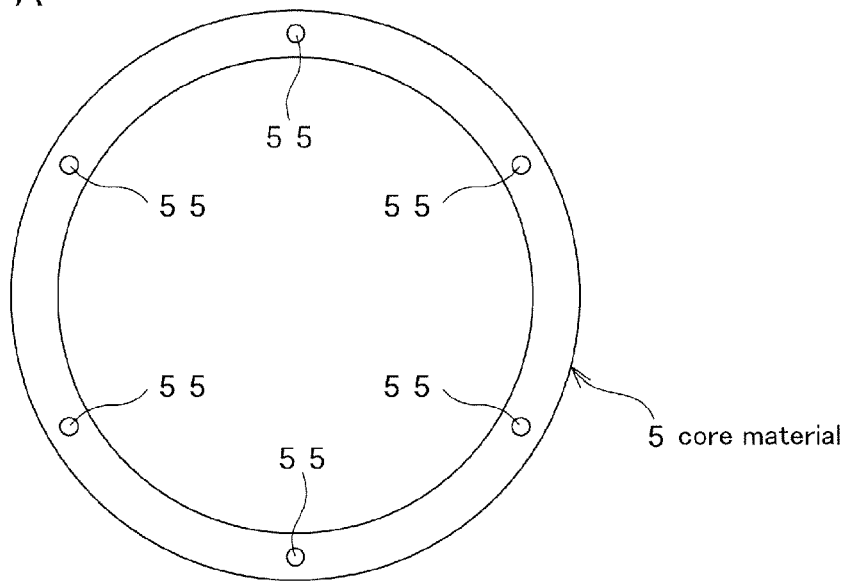
F I G. 9 B
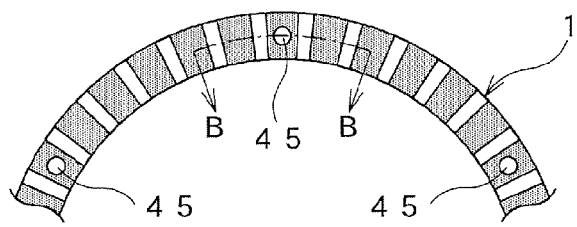
F I G. 9 C
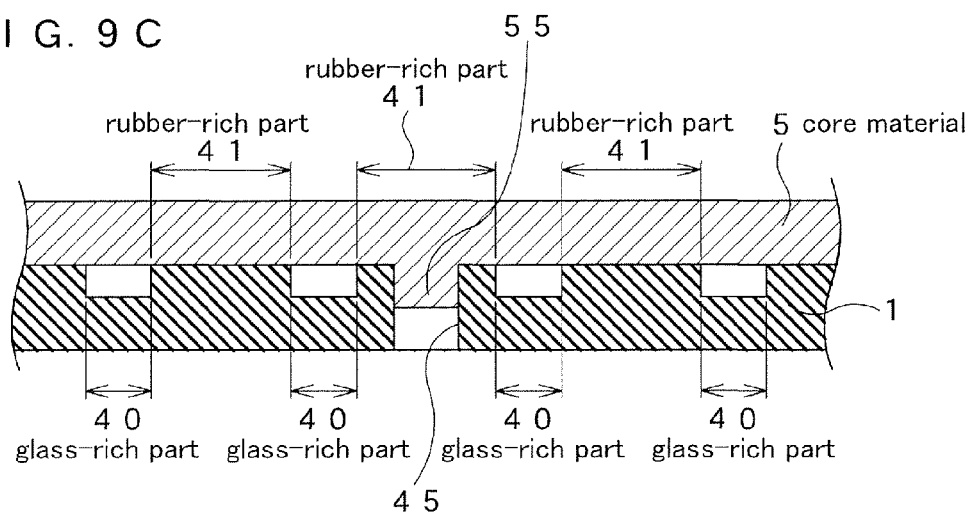

DRY FRICTION MATERIAL AND METHOD FOR MANUFACTURING THE SAME

CROSS REFERENCE TO RELATED APPLICATIONS

This application is a National Stage of International Application No. PCT/JP2011/059333 filed Apr. 15, 2011, claiming priority based on Japanese Patent Application No. 2010-168090 filed Jul. 27, 2010, the contents of all of which are incorporated herein by reference in their entirety.

TECHNICAL FIELD

Background Art

In a system including a dry friction material such as clutch facing, a damper, and a torque limiter or the like, a method is known as a method for manufacturing a dry friction material, as shown in a patent document 1. It comprises a resin impregnation step for impregnating a fiber bundle (glass roving) made by bundling long glass fibers to be a base material with an impregnation liquid containing a thermosetting resin to form a resin-impregnated string, and a rubber adhering step for adhering a compounded rubber to the resin-impregnated string. Here, it is known that a medium of the impregnation liquid is water and that the thermosetting resin is an aqueous melamine-modified phenolic resin with a melamine compounding ratio of not less than 30% and not more than 80%. According to the techniques of the patent document 1, a material for a friction material that does not lower performance of a dry friction material of final product (such as clutch facing) can be manufactured without using an organic solvent in the resin impregnation step or the rubber adhering step.

However, in the techniques described in the patent document 1, if sealing of a case containing the dry friction material is insufficient, outside muddy water, rain water or the like penetrates through a gap and is absorbed into glass fibers exposed on a friction surface by a top surface polishing. In addition, if slide with a friction counter material is not performed for a long period of time in this state, there sometimes occurs a situation where absorbed water causes rust on a steel plate as the friction counter material and where rusting with the friction counter material is generated. In this case, a content of the glass fibers may be lowered when the dry friction material is manufactured.

PRIOR ART DOCUMENT(S)

Patent Document(s)

PATENT DOCUMENT 1: Japanese Patent Laid-Open Publication No. 2000-037797

SUMMARY OF THE INVENTION

Problems that the Invention is to Solve

The dry friction material such as a clutch facing has a decrease in strength and stiffness by lowering the content of the glass fibers as described above. Thereby, there were problems that a cracking or a chipping was easily produced in a hole boring for caulking assembly and that production cost increased with additional costs for a countermeasure or a processing thereof.

The present invention attempts to solve such problems. It is an object of the present invention to provide a dry friction material that can set a content of glass fibers and a content of a compounded rubber at an arbitrary content at a desired position of the dry friction material and a method for manufacturing the same.

Means for Solving the Problems

A dry friction material according to an example of the present invention is a flat ring shaped dry friction material containing glass fibers, a synthetic resin for glass fiber impregnation, and a compounded rubber. Therein, a content of the glass fibers and a content of the compounded rubber at a position of a fixed part of the dry friction material to a core material and at a position other than the fixed part are set such that either one or two of the content of the glass fibers and the content of the compounded rubber is/are different between the position of the fixed part to the core material and the position other than the fixed part.

Here, either one or two of the content of the glass fiber and the content of the compounded rubber at the position of the above-described fixed part and the position other than the fixed part mean that the content of the glass fiber or the content of the compounded rubber at the position of the fixed part and the position other than the fixed part is made different or that the content of the glass fiber and the content of the compounded rubber are made different.

In addition, the above-described fixed part means a part at which the dry friction material is fixed to the core material. It includes a case where caulking such as a tack is used to attach and fix, a case where fitting such as unevenness is used to attach and fix, a case where friction resistance is used to attach and fix, a case where an adhesion is used to attach and fix or the like. It is determined by a working example. The above-described dry friction material means a friction material to be attached to a core material or a friction material that is attached to a core material.

Here, as the synthetic resin for glass fiber impregnation, a thermosetting resin, including a phenolic resin and an epoxy resin, or the like may be used. In particular, a modified phenolic resin, including a melamine-modified phenolic resin, may be used.

Moreover, the compounded rubber means a material that constitutes a dry friction material and that is a mixture containing a rubber such as a synthetic rubber and a natural rubber, a pigment such as carbon black, sulfur, a rubber accelerator, and a filler such a resin dust and calcium carbonate. It is a mixture mainly composed of the rubber.

Furthermore, as the synthetic rubber, acrylonitrile-butadiene rubber (that may be also referred to as NBR or nitrile rubber), stylene-butadiene rubber (SBR) or the like may be used alone or in combination.

In a dry friction material according to an example of the present invention, the glass fibers and the compounded rubber are moved and unevenly distributed when the dry friction material is formed so as to make the content of the glass fibers and the content of the compounded rubber different at the position of the fixed part of the dry friction material to the core material and at the position other than the fixed part.

Here, the content of the glass fibers and the content of the compounded rubber that are made different are obtained by moving the glass fibers and the compounded rubber when the dry friction material is formed and by providing uneven distribution according to a shaping die.

In a dry friction material according to an example of the present invention, the fixed part is a protrusion formed at one side of the dry friction material to be engaged with the core material. Moreover, the content of the compounded rubber of the fixed part is higher than the content of the compounded rubber of the part other than the fixed part.

Here, the fixed part is the protrusion formed at one side of the dry friction material. It means that it is integrated with the core material by contact with the protrusion or by joining thereto.

In a dry friction material according to an example of the present invention, the fixed part has a coefficient of static friction at a contact surface with the core material higher than a coefficient of static friction at a friction surface of the dry friction material.

Here, the coefficient of static friction at the contact surface with the core material is higher than the coefficient of static friction at the friction surface of the dry friction material. It means that stabilization of fixing the core material and the dry friction material is improved by making a coefficient of static friction at a rear surface that contacts with the core material higher than a coefficient of static friction at a top surface to be a friction surface as the dry friction material.

In a dry friction material according to an example of the present invention, the fixed parts have grooves formed between the fixed parts.

Here, the groove between the fixed parts, as a shape thereof, may be anyway as long as it is connected from an inner periphery of the dry friction material to an outer periphery thereof. The same shape may be made in a radial shape or an arciform shape.

In a dry friction material according to an example of the present invention, the content of the glass fibers of the fixed part with the core material is higher than the content of the glass fibers of the part other than the fixed part. Moreover, the content of the compounded rubber of the part other than the fixed part can be higher than the content of the compounded rubber of the fixed part.

Here, the content of the glass fibers of the fixed part of the dry friction material and the core material is higher than the content of the glass fibers of the part other than the fixed part. It means that the content of the glass fibers of the fixed part is increased. On the other hand, the content of the compounded rubber of the part other than the fixed part is higher than the content of the compounded rubber of the fixed part. It means that the content of the compounded rubber of the part other than the fixed part is increased.

In a dry friction material according to an example of the present invention, the content of the glass fibers of the fixed part of the dry friction material and the core material is higher than the content of the glass fibers of the part other than the fixed part. Moreover, the fixed part with the high content of the glass fibers has a bored part made by hole boring.

Here, the content of the glass fibers of the fixed part of the dry friction material and the core material is higher than the content of the glass fibers of the part other than the fixed part, and the fixed part has the bored part made by the hole boring. It means that the fixed part of the dry friction material and the core material has a high content of the glass fibers and that the bored part has a high content of the glass fibers. Moreover, it means that the fixed part of the dry friction material and the core material is the bored part of a bored hole and that the same fixed part has a high content of the glass fibers.

In a dry friction material according to an example of the present invention, the content of the glass fibers of the fixed part with the high content of the glass fibers is within a range of 1.2 times to 4 times of the content of the glass fibers of the part other than the fixed part.

Here, in case the content of the glass fibers of the fixed part is 1.2 times to 4 times of the content of the glass fibers of the part other than the fixed part, it is a condition that can perform simple caulking assembly without impairing a friction characteristic and without generating a cracking or a chipping in the hole boring for caulking assembly, if a content of the glass fibers of a fixed part to be subjected to the hole boring is within a range of 1.2 times to 4 times of a content of the glass fibers of a part not to be subjected to the hole boring.

In a dry friction material according to an example of the present invention, the content of the glass fibers of the fixed part to be subjected to the hole boring is within a range of 22 percent by weight to 40 percent by weight.

Here, the content of the glass fibers of the part to be subjected to the hole boring is within a range of 22 percent by weight to 40 percent by weight, more preferably within a range of 24 percent by weight to 36 percent by weight.

A method for manufacturing a dry friction material according to an example of the present invention comprises a resin impregnation step for impregnating glass fibers with an impregnation liquid containing a thermosetting resin to form resin-impregnated glass fibers, a rubber adhering step for adhering a compounded rubber to the resin-impregnated glass fibers to form a compounding material, a preliminary shaping step for forming the compounding material into a circular-shaped preliminary shaped product, and a shaping step for shaping the preliminary shaped product. In the shaping step, the glass fibers of a fixed part or a part other than the fixed part is moved in one direction at the same time with the shaping to increase a content of the glass fibers or a content of the compounded rubber of the fixed part.

In a method for manufacturing a dry friction material according to an example of the present invention, the shaping step is a press-shaping step wherein the preliminary shaped product is press-shaped with a press die by applying a higher pressure to the fixed part or the part other than the fixed part than the part other than the fixed part or the fixed part.

Here, a difference of the pressure in the press-shaping step between the fixed part or the part other than the fixed part and the part other than the fixed part or the fixed part, from a partial view, logically means one with a high compression rate for compressing and deforming.

In a method for manufacturing a dry friction material according to an example of the present invention, as a means of pressing the fixed part or the part other than the fixed part at the higher pressure than the part other than the fixed part or the fixed part in the press-shaping step, there is provided a protruding part that protrudes at a shaped body side of the press die to correspond to the fixed part or the part other than the fixed part.

Here, in the press-shaping step, the protruding part protruding toward the shaped body side is provided on a part of the press die corresponding to the fixed part or the part other than the fixed part. Thereby, with the protruding part, the glass fibers and the compounded rubber can be easily moved and unevenly distributed when the dry friction material is formed.

In a method for manufacturing a dry friction material according to an example of the present invention, a protrusion height of the protruding part is within a range of 15% to 35% of a thickness of the shaped body to be press-shaped in the pressing step.

Here, the range of 15% to 35% of the thickness of the shaped body to be press-shaped in the pressing step is an experimental value by the inventors, and it is a value at which a failure certainly does not occur in a content of the glass fibers of a fixed part to be subjected to hole boring.

In a dry friction material according to an example of the present invention, the core material and the dry friction material are positioned using an engagement protrusion formed on the core material and an engagement hole formed on the dry friction material.

Here, the positioning of the core material and the dry friction material may be any one as long as the core material and the dry friction material are engaged by a concave and a convex.

In a dry friction material according to an example of the present invention, the core material and the dry friction material are positioned using an engagement protrusion formed on the core material and an engagement hole formed on the dry friction material, instead of the fixed part.

Here, the positioning of the core material and the dry friction material may be any one as long as the core material and the dry friction material are engaged by a concave and a convex. Not only a sense of unity of the core material and the friction material is easily obtained, but also the fixed part can be abolished by functions of the position of the fixed part of the dry friction material and the core material and the position of the part other than the fixed part.

Effects of the Invention

The dry friction material of an exemplary embodiment is the flat ring shaped dry friction material containing the glass fibers, the synthetic resin for glass fiber impregnation, and the compounded rubber. Therein, the content of the glass fibers and the content of the compounded rubber are set such that either one or two of the content of the glass fibers and the content of the compounded rubber is/are different between the position of the fixed part to the core material and the position other than the fixed part.

Accordingly, where a part with a high content of the glass fibers or a part with a high content of the compounded rubber is used as the fixed part to the core material, while the part with the high content of the glass fibers is used as the fixed part, strength or stiffness is higher than that of the part other than the fixed part. Thereby, a processing such as hole boring becomes easier. On the other hand, while the part with the high content of the compounded rubber is used as the fixed part, friction force of the fixed part is higher than that of the part other than the fixed part. Thereby, it can be directly attached and fixed to the core material.

In the dry friction material of an exemplary embodiment, the glass fibers and the compounded rubber are moved and unevenly distributed when the dry friction material is formed so as to make the content of the glass fibers and the content of the compounded rubber different at the position of the fixed part of the dry friction material to the core material and at the position other than the fixed part. Thus, in addition to the effects described in paragraphs [0040]-[0041], the content of the glass fibers and the content of the compounded rubber at the position of the fixed part to the core material and at the position of the part other than the fixed part can be varied by shaping. Consequently, even if the content of the glass fibers and the content of the compounded rubber on the whole dry friction material are specified in advance, a mechanical characteristic, especially friction force, of a part fixed to the core material can be arbitrarily set depending on a method for fixing to the core material, so that a productive processing can be performed.

In the dry friction material of an exemplary embodiment, the fixed part is the protrusion formed at one side of the dry friction material. Moreover, the content of the compounded rubber of the fixed part is higher than the content of the compounded rubber of the part other than the fixed part. Thus, in addition to the effects described in paragraphs [0040]-[0042], since the fixed part has a high content of the compounded rubber, a coefficient of static friction can be increased, and the dry friction material can be stably attached.

In the dry friction material of an exemplary embodiment, the fixed part has the coefficient of static friction at the contact surface with the core material higher than the coefficient of static friction at the friction surface of the dry friction material. Thus, in addition to the effects described in paragraphs [0040]-[0043], since the coefficient of static friction at the contact surface with the core material is higher than the coefficient of static friction at the friction surface of the dry friction material, the friction surface of the dry friction material slides in relation to a counter material, while the fixing to the core material can be stably maintained even when it is sliding.

In the dry friction material of an exemplary embodiment, the fixed parts have the grooves formed between the fixed parts. Thus, in addition to the effects described in paragraphs [0040]-[0044], the dry friction material and the core material are more certainly fixed by engagement of the core material with the grooves formed between the fixed parts.

In the dry friction material of an exemplary embodiment, the content of the glass fibers of the fixed part to the core material is higher than the content of the glass fibers of the part other than the fixed part. Thus, in addition to the effects described in paragraphs [0040]-[0042], a processing in fixing to the core material becomes easier, and production costs can be reduced.

In the dry friction material of an exemplary embodiment, the fixed part to the core material has a bored part made by hole boring. Thus, in addition to the effects described in paragraph [0046], caulking assembly with the core material can be performed by the bored part, and simple and more certain fixing to the core material can be performed.

In the dry friction material of an exemplary embodiment, the content of the glass fibers of the fixed part to be subjected to the hole boring is within the range of 1.2 times to 4 times of the content of the glass fibers of the part other than the fixed part. Thus, in addition to the effects described in paragraph [0047], in case the content of the glass fibers on a whole friction material is set low, strength and stiffness of the fixed part to be subjected to the hole boring can be significantly improved more certainly.

In the dry friction material of an exemplary embodiment, the content of the glass fibers of the fixed part to be subjected to the hole boring is within the range of 22 percent by weight to 40 percent by weight. Thus, in addition to the effects described in paragraphs [0047]-[0048], it is possible to more certainly prevent a situation where a failure in the hole boring occurs such as a cracking and a chipping occurs at the bored part to be subjected to the hole boring. In particular, the content of the glass fibers of the bored part to be subjected to the hole boring is more preferably within a range of 24 percent by weight to 36 percent by weight, since it is possible to still more certainly prevent a situation where a failure in the hole boring such as the cracking and the chipping occurs.

The method for manufacturing the dry friction material of an exemplary embodiment comprises the resin impregnation step for impregnating the glass fibers with the impregnation liquid containing the thermosetting resin to form the resin-impregnated glass fibers, the rubber adhering step for adhering the compounded rubber to the resin-impregnated glass fibers to form the compounding material, the preliminary shaping step for forming the compounding material into the circular-shaped preliminary shaped product, and the shaping step for shaping the preliminary shaped product. In the shaping step, the glass fibers of the fixed part or the part other than the fixed part is moved in the one direction at the same time with the shaping to increase the content of the glass fibers or the content of the compounded rubber of the fixed part.

Thereby, in case the content of the glass fibers of the fixed part is increased, the content of the glass fibers of the fixed part (bored part) to be subjected to the hole boring increases, so that the strength and stiffness are improved. Thus, the hole boring can be performed without generating a failure in the hole boring such as the cracking and the chipping as in a hole boring of the conventional dry friction material, so that simple caulking assembly can be performed. Consequently, production costs can be reduced.

Accordingly, the content of the glass fibers on the whole dry friction material can be maintained low, and the hole boring for caulking assembly can be performed with high strength and high stiffness of the bored part.

On the other hand, in case the content of the compounded rubber of the fixed part is increased, a coefficient of static friction of the fixed part increases as compared with a friction surface. Thus, the friction surface slides in relation to a counter material, and the fixing to the core material can be stably maintained even when it is sliding. Accordingly, the fixing to the core material can be simply performed.

In the method for producing the dry friction material of an exemplary embodiment, the shaping step is the press-shaping step wherein the preliminary shaped product is press-shaped with the press die by applying the higher pressure to the fixed part or the part other than the fixed part than the part other than the fixed part or the fixed part. Thus, in addition to the effects described in paragraph [0050], with the press-shaping at the high pressure, the compounded rubber in the compounding material is pushed out to the part other than the fixed part or to the fixed part from the fixed part or from the part other than the fixed part, thereby forming a glass-rich part or a rubber-rich part wherein the content of the glass fibers or the content of the compounded rubber of the fixed part increases. Accordingly, the glass-rich part has an increase in strength and stiffness, so that generation of a failure in the hole boring such as a cracking and a chipping can be prevented. The rubber-rich part has an increase in the coefficient of static friction, so that stable fixing to the core material can be performed by friction force.

In the method for manufacturing the dry friction material of an exemplary embodiment, as a means of pressing the fixed part or the part other than the fixed part at the higher pressure than the part other than the fixed part or the fixed part in the press-shaping step, there is provided a protruding part that protrudes at a shaped body side of the press die to correspond to the fixed part or the part other than the fixed part. Thus, in addition to the effects described in paragraph [0054], the content of the glass fibers or the content of the compounded rubber of the fixed part can be more easily increased.

In the method for manufacturing the dry friction material of an exemplary embodiment, the protrusion height of the protruding part is within the range of 15% to 35% of the thickness of the shaped body to be press-shaped in the pressing step. Thus, in addition to the effects described in paragraph [0055], in case the fixing with the core material is carried out by caulking assembly or the like, the content of the glass fibers of the bored part as the fixed part to be subjected to the hole boring can be more certainly increased to a content of the glass fibers at which a failure in the hole boring such as a cracking and a chipping does not occur. On the other hand, in case it is not by the caulking assembly or the like, the content of the compounded rubber of the fixed part can be increased to a content of the compounded rubber that exerts a friction force that is capable of fixing more certainly in relation to the core material.

In the dry friction material of an exemplary embodiment, the core material and the dry friction material are positioned using the engagement protrusion formed on the core material and the engagement hole formed on the dry friction material. Thus, in addition to the effects described in paragraphs [0040]-[0049], a sense of unity of the core material and the dry friction material is easily obtained, since the positioning can be performed.

In the dry friction material of an exemplary embodiment, the core material and the dry friction material are positioned using an engagement protrusion formed on the core material and an engagement hole formed on the dry friction material, instead of the fixed part. Thus, in addition to the effects recited described in paragraphs [0040]-[0049], not only a sense of unity of the core material and the dry friction material is easily obtained, since the positioning can be performed, but also the fixed part can be abolished.

BRIEF DESCRIPTION OF THE DRAWINGS

FIG. 1 is a flowchart showing manufacturing steps of a dry friction material according to an embodiment of the present invention.

FIG. 7 is an explanation view showing structures of the dry friction material and a core material according to the third embodiment of the present invention.

FIG. 8 is a graph of a coefficient of static friction of the dry friction material according to the third embodiment of the present invention.

FIG. 9A is a front view of a core material according to a fourth embodiment of the present invention, FIG. 9B is a partial front view of a dry friction material according to the fourth embodiment of the present invention, and FIG. 9C is a partial principal part cross-sectional view taken along a cut line B-B.

EXPLANATION OF CODES

Figure 2A:
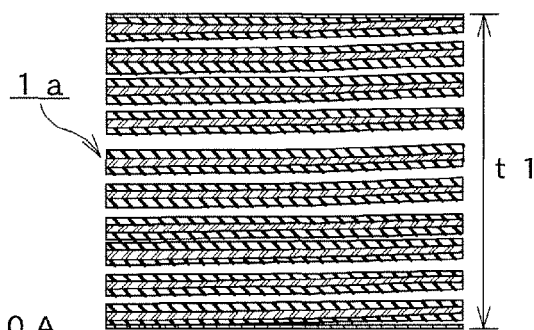
FIG. 2A is a partial longitudinal sectional view showing a part of a longitudinal section of a wound product of a dry friction material according to a first embodiment of the present invention.

1: dry friction material
2: bored hole
3: glass fiber
4: compounded rubber
5: core material
30: glass-rich part
31: rubber-rich part
40: glass-rich part
41: rubber-rich part
45: engagement hole
55: engagement protrusion

EMBODIMENTS OF THE INVENTION

Next, a dry friction material according to an embodiment of the present invention is described referring to FIG. 1 to FIG. 4. First, a method for manufacturing dry friction materials according to the first and second embodiments of the present invention is described referring to FIG. 1. FIG. 1 is a flowchart showing manufacturing steps of a dry friction material according to an embodiment of the present invention.

First of all, in a resin impregnation step, glass fibers are impregnated with an impregnation liquid containing a phenolic resin as a synthetic resin for glass fiber impregnation (melamine-modified phenolic resin in detail) to form resin-impregnated glass fibers (STEP S10). In the embodiment of the present invention, a resin-impregnated string is formed, since a glass roving made by bundling glass fibers is used for the glass fibers. Subsequently, in a rubber adhering step, a compounded rubber is adhered to the resin-impregnated string as the resin-impregnated glass fibers (STEP S11). In a winding step, the resin-impregnated string with the compounded rubber adhered is wound up in a predetermined size (STEP S12). The resin-impregnated string as the resin-impregnated glass fibers is formed into a circular shape by the winding. Accordingly, the winding step is a preliminary shaping step and a wound product is a preliminary shaped product.

In the embodiment of the present invention, the glass roving is used. However, a glass cloth, long glass fibers or the like may be also used.

Here, as the compounded rubber, a mixture mainly composed of a rubber, which contains a synthetic rubber, a pigment such as a carbon black, a sulfur, a rubber accelerator, and a filler such as a resin dust and a calcium carbonate, is used. As the synthetic rubber, a mixture of a butadiene-acrylonitrile rubber (NBR) and a butadiene-styrene rubber (SBR) is used.

In a shaping step, the wound product is pushed in a shaping die and shaped by heating and pressing (STEP S13). In the shaping step, gas venting is performed several times and it is shaped by heating and pressing for 2 minutes under a surface pressure of 15 MPa and a temperature of 165 degrees centigrade. Thereby, a recessed part is formed at the same time on a surface (rear surface) opposite to a friction surface side to be a fixed part or a part other than the fixed part, as will be described hereafter in FIG. 2.

The shaped product is taken out from the shaping die and heated at 240 degrees centigrade for 10 hours (STEP S14). Thereafter, it is cooled to a room temperature, and then both top and rear surfaces are polished (STEP S15). After it is processed to a predetermined thickness, hole boring is conducted as needed (STEP S16). Thus, a dry friction material 1 according to the present embodiment is completed. STEP S16 for conducting the hole boring as needed can be omitted in one which does not require such hole boring. At this time, in the one which requires the hole boring in order to fix with a core material, a recessed part becomes a fixed part. On the other hand, in the one which does not require the hole boring, a recessed part is formed on a part other than the fixed part. The hole boring for positioning may not be provided. It may be provided on either of the fixed part or the part other than the fixed part at the time of providing.

First Embodiment

Next, a more specific manufacturing step of a dry friction material according to the first embodiment of the present invention is described referring to FIG. 2.

Figure 2B:
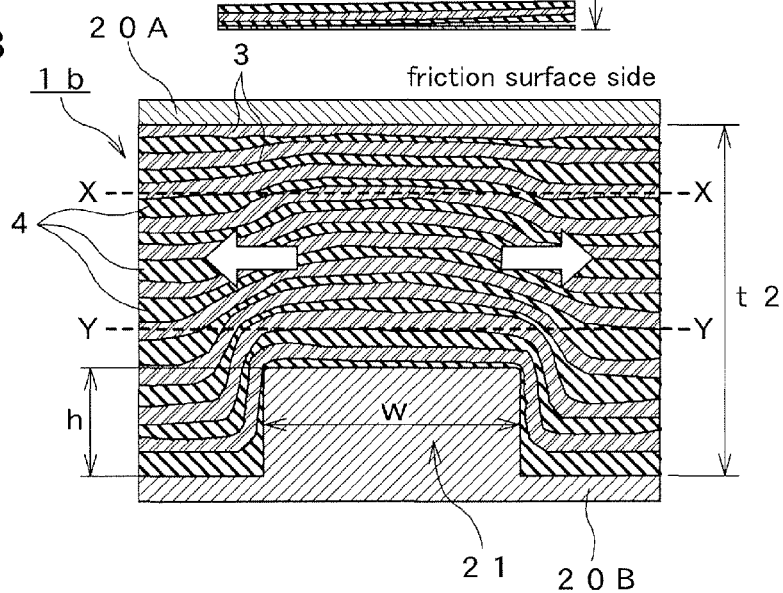
FIG. 2B is a partial longitudinal sectional view showing a part of a longitudinal section of a press-shaped product and a part of a longitudinal section of a press die.

As shown in FIG. 2A, in the manufacturing steps of the dry friction material 1 according to the first embodiment, a wound product 1a as a preliminary shaped product manufactured in the winding step (STEP S12 of FIG. 1) as the preliminary shaping step has a thickness of t1. t1 is generally within a range of about 5 mm to 15 mm. As shown in FIG. 2B, the wound product 1a is pushed in a shaping die, to be more precise, a lower die 20A and an upper die 20B of a press die 20 to be press-shaped in the press-shaping step (STEP S13 of FIG. 1), so that it is formed into a shaped body 1b having a thickness of t2 (t1>t2).

At this time, a rib 21 of the upper die 20B of the press die is provided so as to protrude toward a shaped body side (friction surface side) on an opposite surface (rear surface) in relation to a friction surface side of a bored part to be subjected to the hole boring, which is to be a fixed part of the press die 20. Thus, the rib 21 is designed to have a shape having a height of h such that it has a predetermined angle to a center of a diameter so that a width located at a center in a radial direction of the dry friction material 1 (center of inner and outer diameters) becomes a width W. It is formed into a fan-shape of substantially a rectangular parallelepiped shape. Thereby, the bored part to be subjected to the hole boring is pressed at a higher pressure, and as indicated by outline arrows in FIG. 2B, a compounded lubber 4 having fluidity is pushed to a part not to be subjected to the hole boring, and the glass fibers 3 enter a part from which the compounded rubber 4 is slipped out and move in a protruding direction of the rib 21 (friction surface side). Then, a density thereof increases and a recessed part is formed on the rear surface. As a result, a content of the glass fibers 3 of the bored part of the shaped body to be subjected to the hole boring increases. The rib 21 is a protruding part.

Figure 7A:
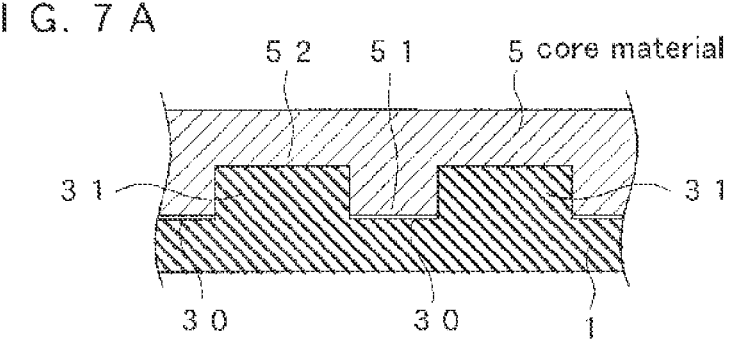
FIG. 7A is a sectional view taken along a cut line A-A of FIG. 7B showing a state of joining to the dry friction material.

Here, a part, on which the rib 21 of the upper die 20B of the press die 20 is provided so as to protrude toward the shaped body side (friction surface side) and which has a high density of the glass fibers 3, is referred to as a glass-rich part 30. This part has a bored hole 2 opened and is joined to a core material 5. Accordingly, the glass-rich part 30 is a fixed part to the core material 5 (See FIG. 7). In addition, a part, which is formed by pushing the compounded rubber 4 in the glass-rich part 30 to a part other than the fixed part as a part not to be subjected to the hole boring, is referred to as a rubber-rich part 31.

The protrusion height h of the rib 21 provided on the press die 20 as the protruding part is preferably within a range of 15% to 35% of the thickness t2 of the shaped body 1b. If it is less than 15%, movement of the compounded rubber 4 is insufficient and there is a lack of a content of the glass fibers. On the other hand, if it is over 35%, a failure easily occurs in shaping. In addition, a width thereof (center width of inner and outer diameters in a circumferential direction) W is preferably within a range of 1.5 times to 5 times of a diameter of the bored hole 2 for use in caulking assembly. If it is less than 1.5 times, it increases a possibility that a cracking or a chipping occurs by offset in positioning at the time of hole boring of the bored hole 2 located at the glass-part 30. On the other hand, if it is over 5 times, a surface pressure applied to the dry friction material 1 is unevenly distributed in using, so that a failure easily occurs. In the present embodiment, the recessed part is formed on the rear side. However, unless a friction characteristic is affected, the recessed part may be formed on the friction surface side or may not be formed thereon.

Figure 2C:
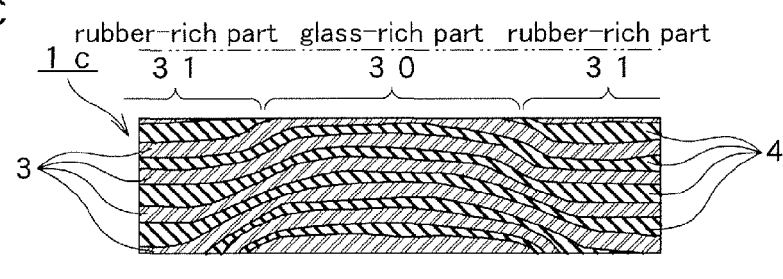
FIG. 2C is a partial longitudinal sectional view showing a part of a longitudinal section of a polished product.
Figure 2C:
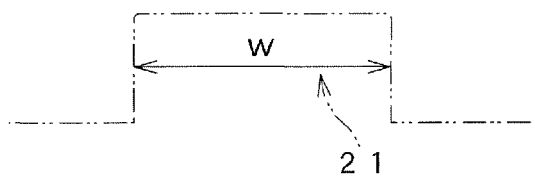
Figure 2D:
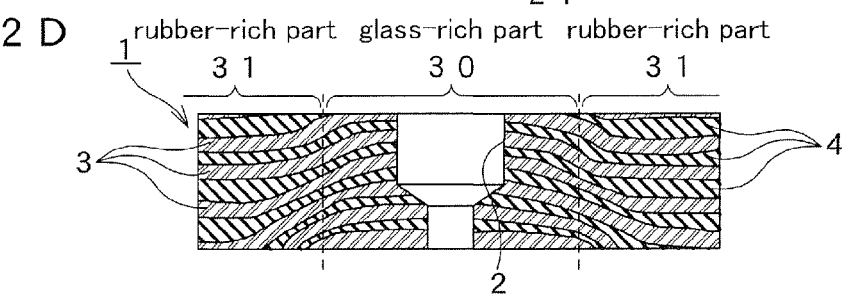
FIG. 2D is a partial longitudinal sectional view showing a part of a hole-bored product.

As shown in FIG. 2C, the same shaped body 1b is formed into a polished product 1a having a flat ring shape as a whole by polishing both top and rear sides thereof in the polishing step (STEP S15 of FIG. 1) up to a polishing line X-X to determine a polishing region of a top side and a polishing line Y-Y to determine a polishing region at a part upper than the protrusion height h of the rib 21 of the rear side. Here, as described above, the bored part to be subjected to the hole boring has a high content (content density) of the glass fibers 3, so that the strength and stiffness increase. Accordingly, as shown in FIG. 2D, the hole boring is applied without generating a cracking, a chipping or the like in the hole boring step (STEP S16 of FIG. 1) for the bored hole 2 located at the glass-rich part 30, so that a dry friction material 1 having a plurality of bored holes 2 is completed. In the present embodiment, both the surfaces are polished. However, only one surface may be polished depending on a thickness or a mounting form of the dry friction material.

Here, the inventors performed an experiment on a relationship between the content of glass fibers and a percent defective in the hole boring for the bored hole 2 located at the glass-rich part 30.

Figure 3:
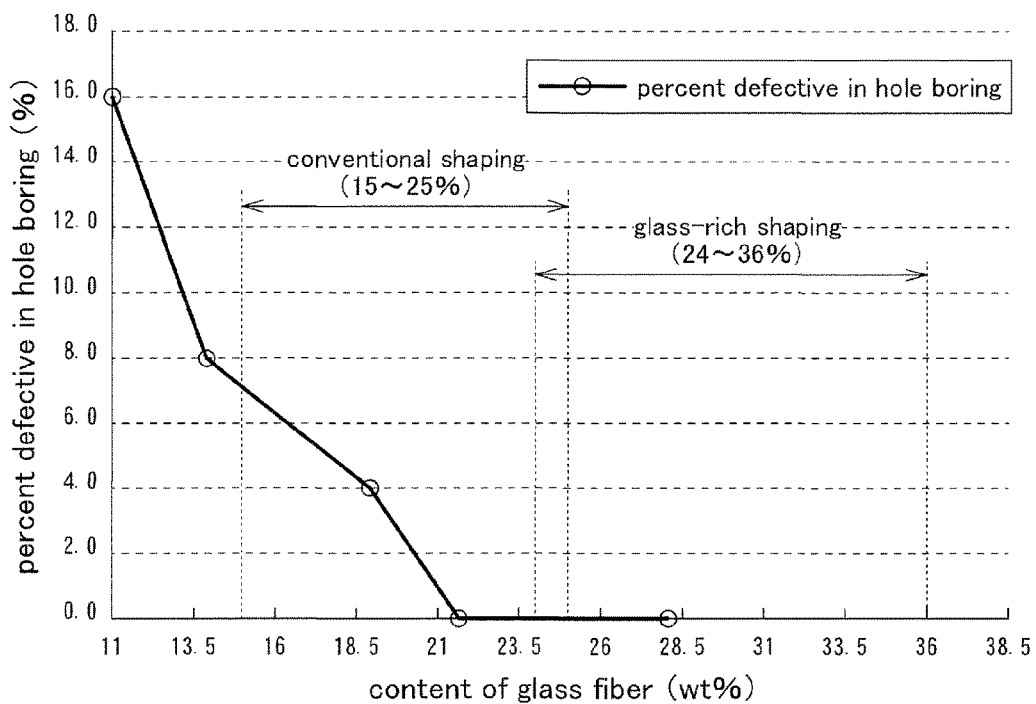
FIG. 3 is a graph showing a relationship between a content of glass fiber of the dry friction material according to the first embodiment of the present invention and a percent defective in hole boring.

More specifically, a plurality of specimens having different contents of the glass fibers within a range of 11 percent by weight to 28 percent by weight were manufactured according to the flowchart of FIG. 1. Then, the hole boring for a plurality of bored holes 2 located at glass-rich parts 30 was conducted on each of the specimens to check a percent defective in the hole boring such as a cracking and a chipping. The results are shown in FIG. 3. FIG. 3 is a graph showing a relationship between a content of glass fibers and a percent defective in hole boring.

As shown in FIG. 3, when the content of glass fibers is within a range of 11 percent by weight to 22 percent by weight, a failure in the hole boring occurs. On the other hand, when the content of glass fiber is 22 percent by weight or more, a percent defective in the hole boring is zero percent.

Figure 4A:
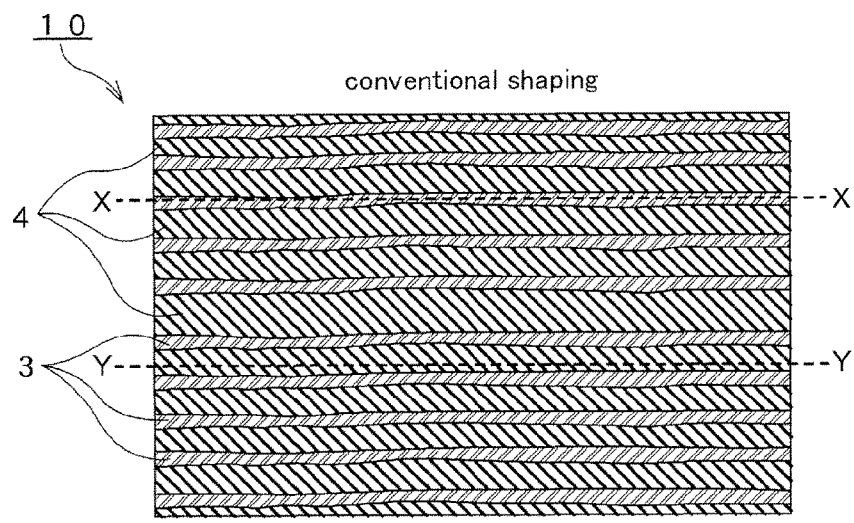
FIG. 4A is a partial longitudinal sectional view showing a part of a longitudinal section of a press-shaped product by a conventional shaping method.
Figure 4B:
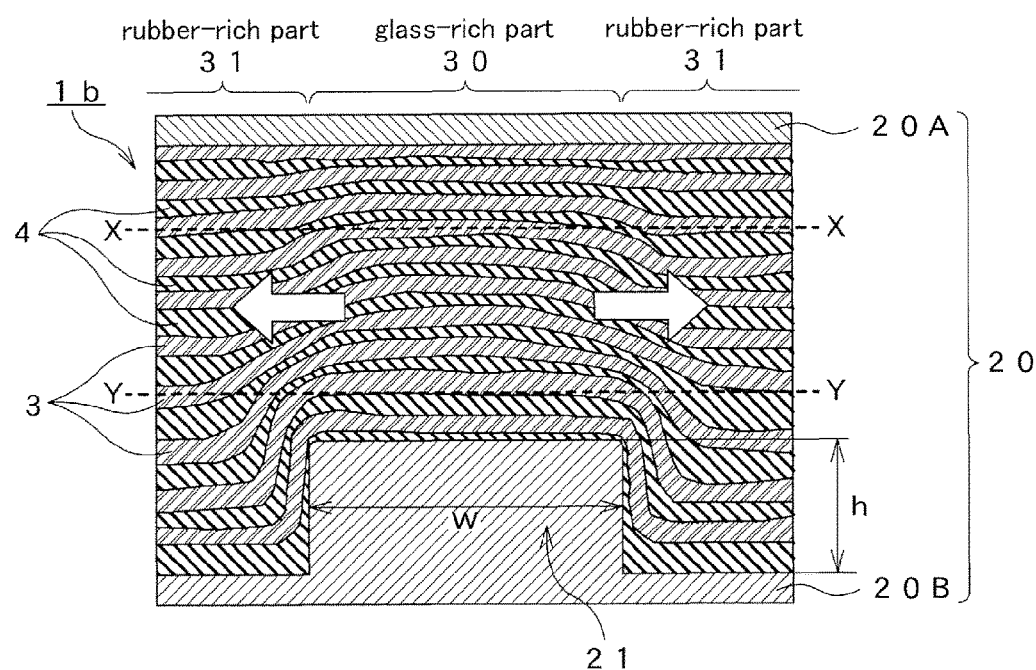
FIG. 4B is a partial longitudinal sectional view showing a part of a longitudinal section of a press-shaped product and a part of a longitudinal section of a press die according to the first embodiment of the present invention.

In contrast, FIG. 4A is a partial longitudinal sectional view showing a part of a longitudinal section of a press-shaped product by a conventional shaping method, and FIG. 4B is a partial longitudinal sectional view showing a part of longitudinal sections of a press-shaped product and a part of a press die according to the first embodiment of the present invention.

According to a manufacturing method shown in the flowchart of FIG. 1, a content of glass fibers of each part was measured on a dry friction material manufactured by the conventional press-shaping as shown in FIG. 4A and on a dry friction material 1 having glass-rich parts 30 and rubber-rich parts 31 provided therebetween that were formed over an entire circumference thereof by press-shaping, in other words, glass-rich shaping according to the present embodiment. The results are shown in TABLE 1.

TABLE 1

| | glass fiber-containing material | | |
| --- | --- | --- | --- |
| | conventional shaping | glass-rich shaping (rib height: 1.9 mm) | |
| | | glass-rich part | rubber-rich part |
| content of glass fiber wt % | 15 to 25 | 24 to 36 | 11 to 19 |

As shown in TABLE 1, in case the conventional press-shaping is performed, a content of glass fibers is within a range of 15 percent by weight to 25 percent by weight. On the other hand, in case the glass-rich shaping is performed for the glass-rich part 30, a content of glass fibers of a part other than the glass-rich part 30 or a rubber-rich part 31 is within a range of 11 percent by weight to 19 percent by weight, while a content of glass fibers of the glass-rich part 30 is increased to a range of 24 percent by weight to 36 percent by weight. Calculating an increase rate thereof at this time, it is within a range of 1.2 times to 4 times and is two times or more on average.

If the results are applied to the graph of FIG. 3, as shown in FIG. 3, it is found that a failure in the hole boring may occur in case the conventional press-shaping is performed, however, that a failure in the hole boring does not occur at the glass-rich part 30 to be subjected to the hole boring in case the glass-rich shaping is performed.

As described above, in the dry friction material 1 according to the first embodiment of the present invention and the method for manufacturing the same, there are provided a dry friction material and a method for manufacturing the same wherein the glass-rich part 30 to be subjected to the hole boring can be formed with a high content of glass fibers when the content of glass fibers on the whole dry friction material cannot be made high and wherein the glass-rich part 30 has high strength and high stiffness and can be subjected to the hole boring for caulking assembly.

Second Embodiment

Figure 5A:
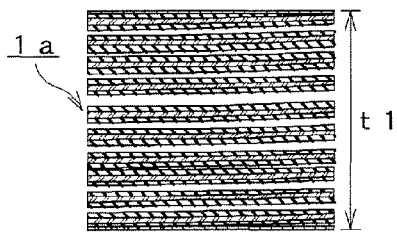
FIG. 5A is a partial longitudinal sectional view showing a part of a longitudinal section of a wound product according to a second embodiment of the present invention.

As shown in FIG. 5A, a wound product 1a manufactured in a winding step corresponding to STEP S12 of FIG. 1 in manufacturing steps of a dry friction material 1 according to a second embodiment of the present invention has a thickness of t1 as in the first embodiment. The wound product 1a is press-shaped by pushing an upper die 20B in a lower die 20A of a press die 20 in a press-shaping step corresponding to STEP S13 of FIG. 1 to be formed into a shaped body 1b having a thickness of t2 (t1>t2), as shown in FIG. 5B.

At this time, a rib 21 of the upper die 20B of the press die 20 is provided so as to protrude toward a shaped body side (friction surface side) on an opposite surface (rear surface) in relation to a friction surface side of a glass-rich part 30 that is a bored part of the press die to be subjected to the hole boring. The rib 21 has a fan-shape of substantially a rectangular parallelepiped shape made into a shape having a predetermined angle to the center of the diameter and having a height of h such that a width located at a center in a radical direction of the dry friction material 1 (center of inner and outer diameters) becomes a width W. Thereby, a bored hole 2 of the glass-rich part 30 to be subjected to the hole boring is pressed at a higher pressure, and as indicated by outline arrows in FIG. 5B, a compounded rubber 4 having fluidity is pushed to a rubber-rich part 31 not to be subjected to the hole boring, so that glass fibers 3 enter a part from which the compounded rubber 4 is slipped out and move to a protruding direction of the rib 21 (to the friction surface side). Then, a density thereof increases and a recessed part is formed on the rear surface. As a result, a content of the glass fibers 3 of the glass-rich part 30 of the shaped body 1b to be subjected to hole boring increases.

Here, the protrusion height h of the rib 21 provided on the upper die 20B of the press die 20 as the protruding part is preferably within a range of 15% to 35% of the thickness t2 of the shaped body 1b. If it is less than 15%, movement of the compounded rubber 4 is insufficient and there is a lack of a content of the glass fibers. On the other hand, if it is over 35%, a failure easily occurs in shaping. In addition, a width thereof (center width of inner and outer diameters in a circumferential direction) W is preferably within a range of 1.5 times to 5 times of a diameter of the bored hole 2 for use in caulking assembly. If it is less than 1.5 times, it increases a possibility that a cracking or a chipping occurs by offset in positioning at the time of hole boring of the bored hole 2 located at the glass-part 30. On the other hand, if it is over 5 times, a surface pressure applied to the dry friction material 1 is unevenly distributed in using, so that a failure easily occurs. For example, when the protrusion height h of the rib 21 is 3 mm to 5 mm, W is 1.5 mm to 3.0 mm.

Figure 5B:
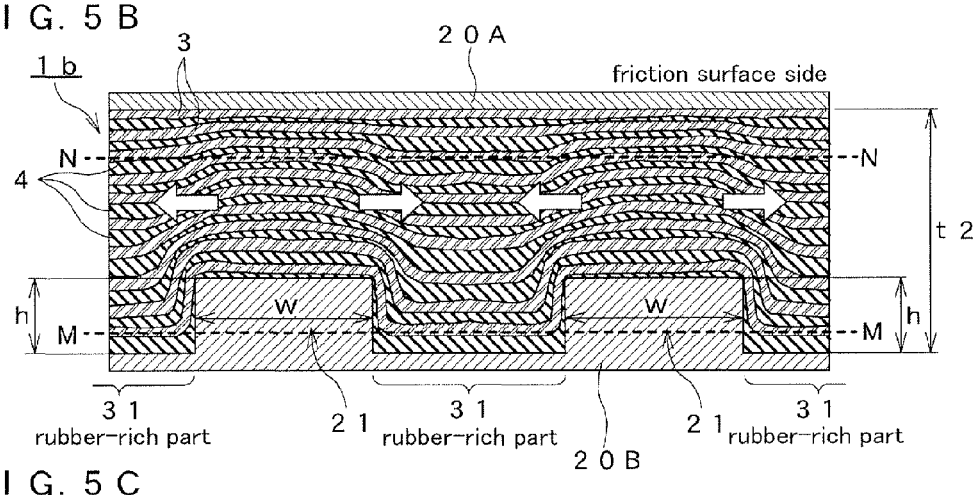
FIG. 5B is a partial longitudinal sectional view showing a part of a longitudinal section of a press-shaped product and a part of a longitudinal section of a press die according to the second embodiment of the present invention.
Figure 5C:
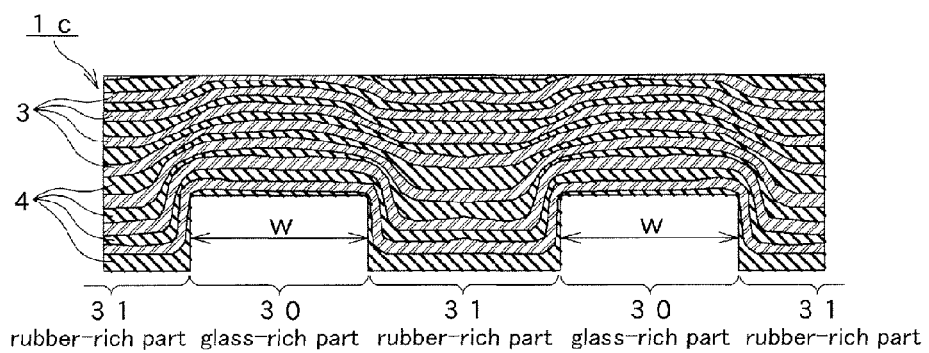
FIG. 5C is a partial longitudinal sectional view showing a part of a longitudinal section of a polished product.

As shown in FIG. 5B, the shaped body 1b of the present embodiment is formed into a polished body 1c having a flat ring shape by polishing both top and rear sides thereof in a polishing step corresponding to STEP S15 of FIG. 1 up to a polishing line N-N to determine a polishing region of a top side and a polishing line M-M in a region determined by the protrusion height h of the rib 21 of the press die 20 of the rear side. Here, as described above, the glass-rich part 30 to be subjected to the hole boring has a high content (content density) of the glass fibers 3, so that the strength and stiffness increase. In addition, in the dry friction material 1 having the rubber-rich parts 31 between the glass-rich parts 30, a compounded rubber 4 moves from the glass-rich part 30 side to the rubber-rich part 31 side, when the glass-rich part 30 is formed, and is unevenly distributed as it is. Thereby, the content (content density) of the compound rubber 4 is high in the rubber-rich part 31 side located between the bored parts to be subjected to the hole boring.

Figure 5D:
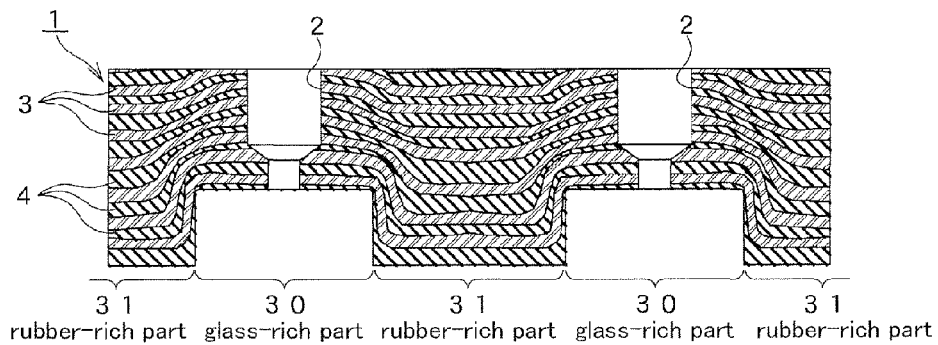
FIG. 5D is a partial longitudinal sectional view showing a part of a hole-bored product.

Accordingly, as shown in FIG. 5D, the hole boring is processed without generating a cracking, a chipping or the like in a hole boring step for the glass-rich part 30 corresponding to STEP S16 of FIG. 1, so that a dry friction material 1 having a plurality of bored holes 2 at a surrounding area thereof is completed. In the present embodiment, both the surfaces are polished. However, only one surface may be polished.

Here, a relationship between a content of glass fibers and a percent defective in the hole boring of the bored part 30 is the same as the graph showing the relationship between the content of the glass fibers and the percent defective in the hole boring shown in FIG. 3.

In addition, in case of a dry friction material manufactured by the conventional press-shaping and the present embodiment, as shown in FIG. 4, a content of glass fibers of the bored hole 2 of the glass-rich part 30 is within a range of 24 percent by weight to 36 percent by weight. On the other hand, a content of glass fibers of a part other than the glass-rich part 30 or a rubber-rich part 31 is within a range of 11 percent by weight to 19 percent by weight. By contrast, calculating an increase rate thereof at this time, it is in a range of 1.2 times to 4 times and is 2 times on average. In case the conventional press-shaping was applied, a content of glass fibers was within a range of 15 percent by weight to 25 percent by weight. That is, as shown in FIG. 3, it is found that a failure in the hole boring may occur in case the conventional press-shaping is performed, however, that a failure in the hole boring does not occur at the glass-rich part 30 to be subjected to the hole boring in case the glass-rich shaping is performed.

As described above, in the dry friction material 1 according to the second embodiment of the present invention and the method for manufacturing the same, there are provided a dry friction material and a method for manufacturing the same wherein the glass-rich part 30 to be subjected to the hole boring can be formed with a high content of glass fibers when the content of glass fibers on the whole dry friction material cannot be made high and wherein the glass-rich part 30, particularly the bored hole 2, has high strength and high stiffness and can be subjected to the hole boring for caulking assembly. In addition, the rubber-rich part 31 has a high coefficient of static friction. In case an entire friction surface of the dry friction material 1 uniformly contacts with a clutch disc or the like, a rotating force of the clutch disc or the like is applied to the dry friction material 1. However, the rubber-rich part 31 has a high friction resistance with a core material 5 (See FIG. 7), so that the same rubber-rich part 31 makes it hard to give stress to the glass-rich part 30. Thereby, concentration of stress is prevented from being applied to the bored part to be subjected to the hole boring in using, so that uniform contact can be obtained over an entire surface of the dry friction material.

Third Embodiment

The above-described first and second embodiments were described on the assumption that the bored hole 2 was provided on the glass-rich part 30. However, in the practice of the present invention, it is possible to omit the bored hole 2 on the glass-rich part 30 to the fixing to the core material 5, since, as described in the second embodiment, the rubber-rich part 31 has a high friction resistance with the core material 5 and such rubber-rich part 31 makes it hard to give stress to the glass-rich part 30.

Figure 6A:
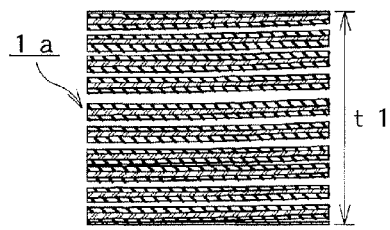
FIG. 6A is a partial longitudinal sectional view showing a part of a longitudinal section of a wound product of a dry friction material according to a third embodiment of the present invention.
Figure 6B:
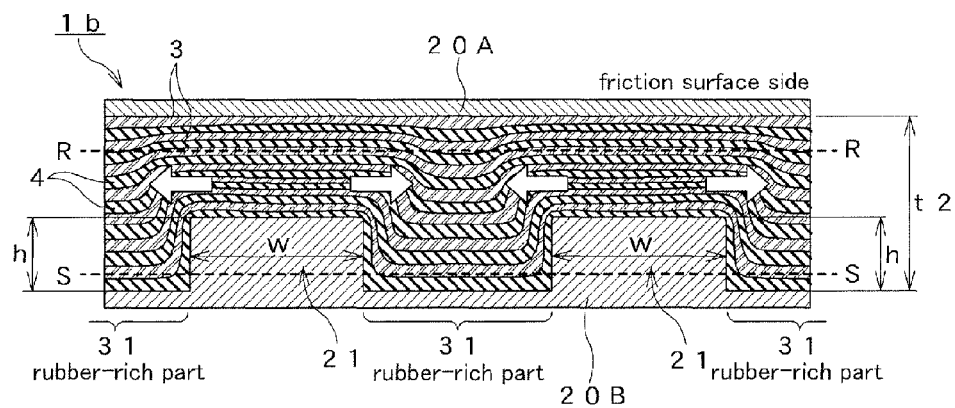
FIG. 6B is a partial longitudinal sectional view showing a part of a longitudinal section of a press-shaped product and a part of a longitudinal section of a press die.

FIG. 6 is the same third embodiment and a basic structure thereof is the same as the second embodiment. In particular, FIG. 6A and FIG. 6B of the present embodiment are basically not different from FIG. 5A and FIG. 5B of the second embodiment.

Figure 6C:
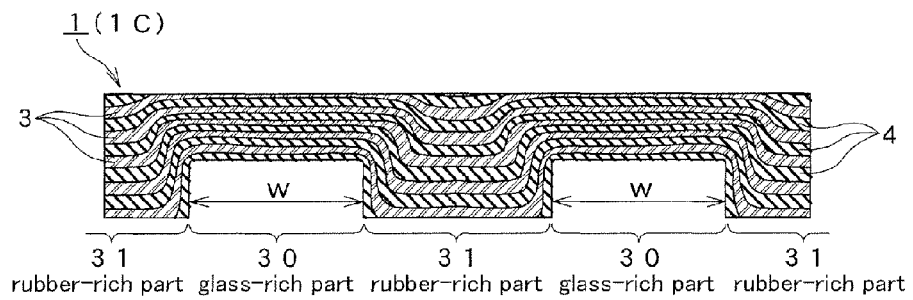
FIG. 6C is a partial longitudinal sectional view showing a part of a longitudinal section of a polished product.

As shown in FIG. 6C, a shaped body 1c of the present embodiment is formed into a polished body 1c having a flat ring shape or a dry friction material 1 by polishing both top and rear sides thereof in a polishing step corresponding to STEP S15 of FIG. 1 up to a polishing line R-R to determine a polishing region of a top side and a polishing line S-S in a region determined by a protrusion height h of a rib 21 of a press die 20 of a rear side.

Here, as described above, a glass-rich part 30 has a high content (content density) of glass fibers 3, so that the strength and stiffness increase. In addition, in the dry friction material 1 having rubber-rich parts 31 between glass-rich parts 30, a compounded rubber 4 moves from the glass-rich part 30 side to the rubber-rich part 31 side when the glass-rich part 30 is formed and is unevenly distributed as it is. Thereby, the rubber-rich part 31 side has a high content (content density) of the compounded rubber 4.

Figure 7B:
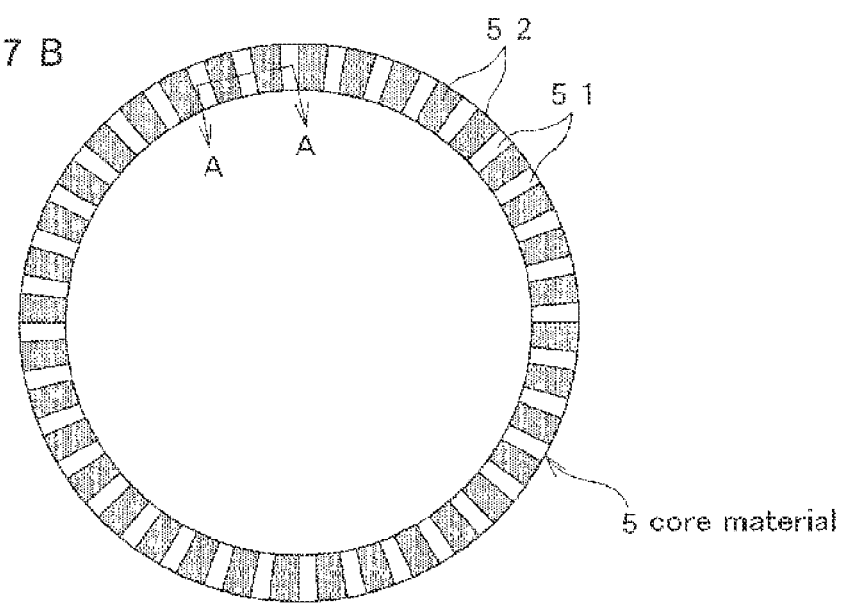
FIG. 7B is a plane view of the core material.
Figure 7C:
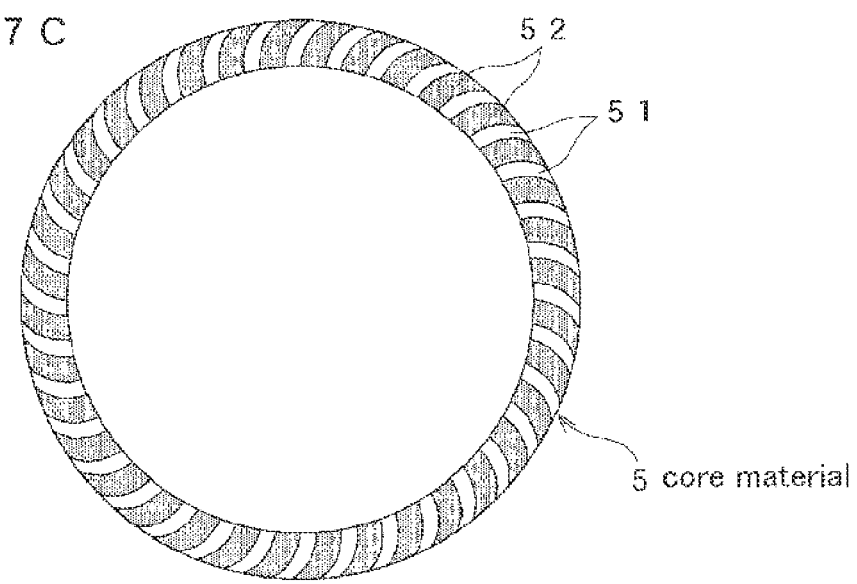
FIG. 7C is a plan view of another example of a core material.

Here, the rubber-rich part 31 to be a protrusion of the shaped body 1c of the third embodiment is fitted into a core material 5 having a recessed part 52 with a depth of the protrusion height h of the rib 21 or less. Then, the dry friction material 1 and the core material 5 are fixed by a concavo-convex fitting without using a fixing means. Accordingly, the rubber-rich part 31 is a fixed part of the dry friction material 1. In addition, if the third embodiment is viewed from a different view, it can be seen that recessed parts or grooves to be glass-rich parts 30 are formed between rubber-rich parts 31 as a fixed part and that the dry friction material 1 and the core material 5 is fixed via a concavo-convex fitting by the groove of the recessed part and a protrusion 51 provided on the core material 5 makes. At this time, the recessed part or the groove of the dry friction material and the protrusion 51 of the core material 5 may be arranged on the core material 5 and the dry friction material 1 in a radial manner from a center of the core material 5 and a center of the dry friction material 1 as shown in FIG. 7B or in an arciform manner as shown in FIG. 7C. With such arrangement, stable fixing against rotation can be performed.

Here, the rubber-rich part 31 has a high friction resistance. In case an entire friction surface of the dry friction material 1 uniformly contacts with a clutch disc or the like, a rotating force of the clutch disc or the like is applied to the dry friction material 1. However, stable joining can be obtained without relative movement of the dry friction material 1 and the core material, since the rubber-rich part 31 has a high friction resistance with the recessed part 52 of the core material 5 shown in FIG. 7A. In addition, a sufficient mechanical strength can be provided by only fitting the protrusion 51 of the core material 5 into the glass-rich part 30, since a boundary between the glass-rich part 30 and the rubber-rich part 31 has a high content of glass fibers as shown in FIG. 6C. As described above, where the rubber-rich part 31 is a fixed part, the rubber-rich part 31 to be the fixed part can be easily formed by applying a pressure to a part located at the glass-rich part 30 other than the fixed part at the time of press-shaping.

A friction coefficient of the dry friction material 1 of the present third embodiment was measured. As shown in FIG. 8, a coefficient μs of static friction of the friction surface of the clutch disc side or the like of the dry friction material 1 was within a range of 0.3 to 4.5. A coefficient μs of static friction of a contact surface side of the rubber-rich part 31 and the core material 5 or a rear surface side was within a range of 0.55 to 0.7.

The dry friction material 1 of the present third embodiment can achieve a purpose by changing a contact pressure even if the dry friction material 1 serves as a torque limiter clutch, a slip clutch, a thrust damper or the like, since the coefficient μs of static friction of the friction surface of the clutch disc side or the like is 0.3 to 4.5, which is smaller than 0.55 to 0.7 of a coefficient μs of static friction of the rear surface side.

Accordingly, it is not necessary to bore the bored hole 2 on the glass-rich part 30 of the dry friction material 1, so that workability is improved. In addition, if a relative movement of the clutch disc or the like is a movement of a distance of less than h, a clutch operation can be performed, so that the core material 5 and the dry friction material 1 are not separated from each other, since on the core material 5 is formed with a protrusion having a height not more than a protrusion height h of the rib 21 that is provided as a protruding part on an upper die 20B of the press die 20.

Where the protrusion height h of the rib 21 is 3 to 5 mm, widths of the glass-rich part 30 and the rubber-rich part 31 are preferably within a range of 1.5 to 3.0 mm and 2.0 to 5.5 mm. The widths of the glass-rich part 30 and the rubber-rich part 31 are more preferably within a range of 2.0 to 2.5 mm and 3.0 to 4.5 mm in terms of a friction coefficient.

Fourth Embodiment

The above-described first and second embodiments were described on the assumption that the bored hole 2 was provided on the glass-rich part 30. However, in the practice of the present invention, it is possible as shown in FIG. 9 that a part of a rubber-rich part 41 is provided with a bored hole to be an engagement hole 45 for positioning, thereby omitting the fixing means of the core material 5, since, as described in the second embodiment, the rubber-rich part 31 has a high friction resistance with the core material 5 and such rubber-rich part 31 makes it hard to give stress to the glass-rich part 30. This is a fourth embodiment. In the present embodiment, assembly is easy, since an engagement protrusion 55 of the core material 5 may be elastically connected to the engagement hole 45 of the rubber-rich part 41.

As shown in FIG. 6C, a shaped body is of the present embodiment is made into a polished body 1c having a flat ring shape or a dry friction material 1 by polishing both top and rear sides thereof in a polishing step corresponding to STEP S15 of FIG. 1 up to a polishing line R-R to determine a polishing region of a top side and a polishing line S-S in a region determined by a protrusion height h of a rib 21 of a press die 20 of a rear side. As described above, a glass-rich part 40 has a high content (content density) of glass fibers 3 (see FIG. 3), so that the strength and stiffness increase. In addition, in the dry friction material 1 having rubber-rich parts 41 between glass-rich parts 40, a compounded rubber 4 moves from the glass-rich part 40 side to the rubber-rich part 41 side when the glass-rich part 40 is formed and is unevenly distributed as it is. Thereby, the rubber-rich part 41 side has a high content (content density) of the compounded rubber 4. As described above, the content of the compounded rubber of the rubber-rich part 41 to be a fixed part can be set high in such a manner that the rib 21 provided on the press die presses the glass fibers against a friction surface side to move a part to be the glass-rich part 40 other than the fixed part.

In the fourth embodiment, six engagement protrusions 55 are formed on an annular core material 5 at regular intervals. In the practice of the present invention, it is not limited to six. However, three or more engagement protrusions 55 are preferably provided at regular intervals in view of equal sharing of the friction resistance.

In the annular core material 5 of the fourth embodiment, the engagement protrusion 55 are fitted into the engagement holes 45 as the positioning means of the rubber-rich part 41. At this time, the engagement hole 45 is provided on a part that has a high content of the compounded rubber and a high friction coefficient. Thereby, positions of the dry friction material 1 and the core material 5 are fixed by positioning engagement of the engagement protrusions 55 and the engagement holes 45 without using a firm fixing means. Moreover, a coefficient of static friction increases due to a high content of the compounded rubber at a rear surface to be engaged with the core material 5 of the dry friction material 1. The annular core material 5 presses the dry friction material 1 by a predetermined pressing force via a part other than the engagement protrusion 55. Thereby, a friction resistance of the annular core material 5 and the dry friction material 1 increases, so that the dry friction material 1 is completely engaged with the annular core material 5.

Accordingly, the rubber-rich part 41 is used to elastically position the dry friction material 1 without fixing with the glass-rich part 40. Here, the rubber-rich part 41 has a high friction resistance. An entire friction surface of the dry friction material 1 uniformly contacts with a clutch disc or the like, so that a rotating force of the clutch disc or the like is applied to the dry friction material 1. A stable joining can be obtained without relative movement of the dry friction material 1 and the core material, since the rubber-rich part 41 has a high friction resistance with the core material 5. In addition, a sufficient mechanical strength can be provided by only fitting the engagement protrusion 55 of the core material 5 into the rubber-rich part 41, since a boundary between the glass-rich part 40 and the rubber-rich part 41 has a high content of glass fibers. A space between the glass-rich part 40 and the core material 5 becomes an air flow passage for heat release, so that cooling performance can be provided.

Fifth Embodiment

In the above-described fourth embodiment, the rubber-rich part 41 has a high friction resistance with the core material 5 and the rubber-rich part 41 hardly gives stress to the glass-rich part 40. Thereby, a part of the rubber-rich part 41 is used as the engagement hole 45. However, the engagement hole 45 of the rubber-rich part 41 may be provided on the glass-rich part 40 as shown in FIG. 10 in order to firmly position the core material 5 and the dry friction material 1.

As shown in FIG. 6C, a shaped body 1c of the present embodiment is made into a polished body 1c having a flat ring shape or a dry friction material 1 by polishing both top and rear sides thereof in a polishing step corresponding to STEP S15 of FIG. 1 up to a polishing line R-R to determine a polishing region of a top side and a polishing line S-S in a region determined by a protrusion height h of a rib 21 of a press die 20 of a rear side. As described above, a glass-rich part 40 has a high content (content density) of glass fibers 3 (see FIG. 3), so that the strength and stiffness increase. In addition, in the dry friction material 1 having rubber-rich parts 41 between glass-rich parts 40, a compounded rubber 4 moves from the glass-rich part 40 side to the rubber-rich part 41 side when the glass-rich part 40 is formed and is unevenly distributed as it is. Thereby, the rubber-rich part 41 side has a high content (content density) of the compounded rubber 4.

In the fourth embodiment, six engagement protrusions 55 are formed on an annular core material 5 at regular intervals. In the practice of the present invention, it is not limited to six. However, three or more engagement protrusions 55 are preferably provided at regular intervals.

Figure 10A:
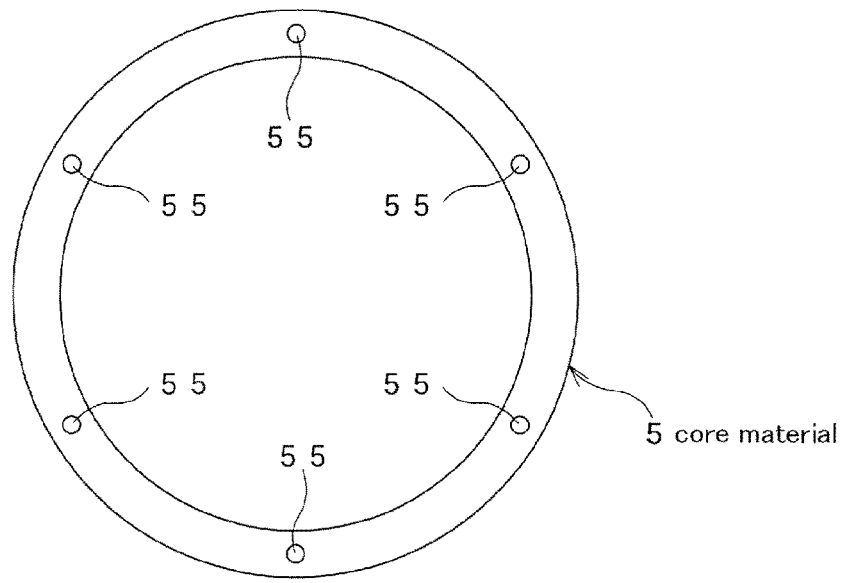
FIG. 10A is a front view of a core material according to a fifth embodiment of the present invention.
Figure 10B:
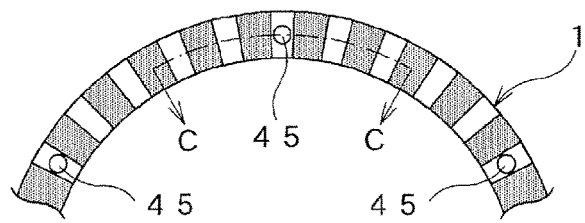
FIG. 10B is a partial front view of a dry friction material according to the fifth embodiment of the present invention.
Figure 10C:
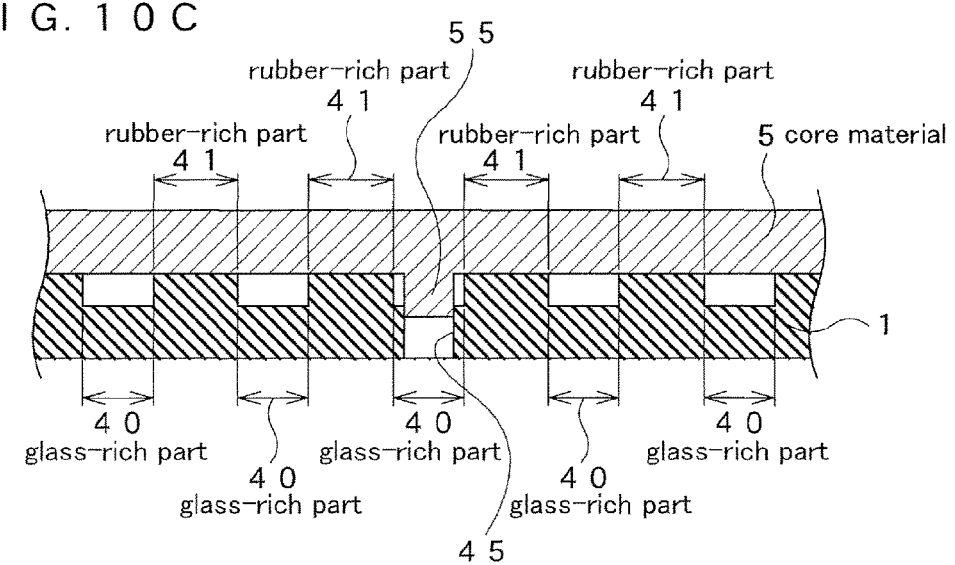
FIG. 10C is a partial principal part cross-sectional view taken along a cut line C-C.

As shown in FIG. 10, in the annular core material 5 of the present fifth embodiment, engagement protrusions 55 are fitted into engagement holes 45 provided on a part of a glass-rich part 40 as a positioning means. Thereby, joining becomes strong without using a firm fixing means and it acts as if it were a fixing means. Thus, positions of the dry friction material 1 and the core material 5 are fixed by engagement of the engagement protrusion 55 with the engagement hole 45. Moreover, the annular core material 5 presses the dry friction material 1 by a predetermined pressing force, so that they are hardly separated. Thereby, a friction resistance between the rubber-rich part 41 of the dry friction material 1 and the annular core material increases.

Here, the rubber-rich part 41 has a high friction resistance. When an entire friction surface of the dry friction material 1 uniformly contacts with a clutch disc or the like and a rotating force of the clutch disc or the like is applied to the dry friction material 1, stable joining can be obtained without relative movement of the dry friction material 1 and the core material, since the rubber-rich part 41 has a high friction resistance with the core material 5. In addition, a sufficient mechanical strength can be provided by only fitting the engagement protrusion 55 of the core material 5 into the rubber-rich part 41, since a boundary between the glass-rich part 40 and the rubber-rich part 41 has a high content of glass fibers.

More specifically, the core material 5 and the dry friction material 1 were positioned using the engagement protrusion 55 formed on the core material 5 and the engagement hole 45 formed on the dry friction material 1. Thereby, it can serve as the fixed part of the first to fourth embodiments. A space between the glass-rich part 40 and the core material 5 becomes an air flow passage for heat release, so that cooling performance can be provided.

In the dry friction material of each of the above-described embodiments, the flat ring shaped dry friction material 1 contains the glass fibers 3 (more specifically, a glass roving made by bundling the glass fibers 3) along a circumferential direction, the synthetic resin for glass fiber impregnation, and the compounded rubber 4. Therein, as regards the content of the glass fibers and the content of the compounded rubber, either one or two of the content of the glass fibers and the content of the compounded rubber is/are made different at the fixed part of the dry friction material 1 to the core material 5, namely at a position corresponding to the glass-rich part 30 to be the bored part on which the bored hole is provided for fixing to the core material 5 by caulking assembly or the like, the glass-rich part 30 to be a fitting part with the protrusion 51 formed on the core material 5, the glass-rich part 40 to be a fitting part with the engagement protrusion 55 formed on the core material 5, or the rubber-rich part 31 to be a fitting part with the recessed part 52 of the core material 5, and the rubber-rich part 41, which is other than the engagement protrusion 55 formed on the core material 5, to be connected to a plane of the core material 5 and at a position other than these fixed parts. Here, the glass-rich part 30 to be the fitting part with the protrusion 51 formed on the core material 5 and the rubber-rich part 31 to be the fitting part with the recessed part 52 of the core material 5 may be formed at the same time. In this case, one that has more parts formed becomes a fixed part.

Accordingly, if the glass-rich part 30 or the glass-rich part 40 having a high content of the glass fibers is used as the fixed part to the core material 5, while increasing the content of the compounded rubber at a part other than the rubber-rich part 30 or the rubber-rich part 40, the strength and stiffness of the fixed part are significantly improved. Moreover, the part other than the fixed part acts in the same manner as the fixed part to the core material 5, since a coefficient of static friction of the part other than the fixed part becomes large. Consequently, a load ratio to the rotating force applied to the fixed part is shared, so that integrity with the core material 5 is further assured. With such significant improvement in the strength and the stiffness of the fixed part as described above, for example, the hole boring can be applied without generating a cracking, a chipping or the like at the bored part when the bored hole 2 to perform caulking assembly with the core material 5 is processed on the fixed part. A contact surface of the core material 5 with the dry friction material 1 may be a flat surface, instead of a concavo-convex shape as shown in FIG. 7.

On the other hand, in case the rubber-rich part 31 or the rubber-rich part 41 having a high content of the compounded rubber is used as the fixed part to the core material 5, a coefficient of static friction of the fixed part having the high content of the compounded rubber increases as compared with an example in which the rubber-rich part 31 or the rubber-rich part 41 is not provided. The friction material 1 and the core material 5 are firmly fixed and integrated by engagement of such a fixed part having an increase in friction force as described above with the core material 5. A contact surface of the core material 5 with the dry friction material 1 preferably has a concave-convex shape as shown in FIG. 7 from the viewpoint of positioning or more assured integration. Or as shown in FIG. 9 or FIG. 10, the engagement protrusion 55 is preferably provided on the core material 5 and the engagement hole 45 to be engaged with the engagement protrusion 55 is preferably provided on the dry friction material 1.

As described above, even if the content of the glass fibers and the content of the compounded rubber on the whole dry friction material 1 are specified, the mechanical strength or the coefficient of static friction (friction force) can be arbitrarily set according to characteristics by changing the content of the glass fibers and/or the content of the compounded rubber depending on a part opposing the core material 5.

In the dry friction material of each of the above-described embodiments, the glass fibers 3 and the compounded rubber 4 are moved and unevenly distributed when the dry friction material 1 is formed. Thus, the content of the glass fibers at the position of the fixed part of the dry friction material 1 and the core material 5, for example, the glass-rich part 30 or the glass-rich part 40 is made different from the content of the compounded rubber at the position of the part other than the fixed part, for example, the rubber-rich part 31 or the rubber-rich part 41. Thereby, a productive processing can be performed, since the content of the glass fibers and the content of the compounded rubber at the position of the fixed part to the core material 5 and the position of the part other than the fixed part can be varied by applying press working. In addition, even if the fixed part is positioned at the rubber-rich part 31 or the rubber-rich part 41 and the part other than the fixed part is positioned at the glass-rich part 30 or the glass-rich part 40, the content of the glass fibers and the content of the compounded rubber can be varied. Thereby, a productive processing can be performed and a similar effect can be obtained.

In the friction material of each of the above-described embodiments, the fixed part is the protrusion composed of the rubber-rich part 31 or the rubber-rich part 41 that is formed all over the dry friction material 1. Moreover, the content of the compounded rubber of the fixed part is higher than the content of the compounded rubber other than the rubber-rich part 31 or the rubber-rich part 41. Thereby, the coefficient of static friction can be increased, since the fixed part has a high content of the compounded rubber. Thus, the dry friction material 1 can be stably fixed to the core material 5 with the part other than the protrusion, for example, the glass-rich part 30 or the glass-rich part 40.

In the dry friction material of each of the above-described embodiments, the fixed part has the coefficient of static friction of the contact surface with the core material 5 higher than the coefficient of static friction of the friction surface of the dry friction material 1. Thereby, even if a counter material such as a clutch disc that contacts with the friction surface side of the dry friction material 1 rotates, the fixed part side does not rotate therewith and integration with the core material 5 can be maintained, since the friction force of the contact surface with the core material 5 is higher than the friction force of the friction surface of the dry friction material 1.

In the dry friction material of each of the above-described embodiments, the fixed parts have the grooves (glass-rich parts 30) formed between the same fixed parts (rubber-rich parts 31). The dry friction material 1 is firmly fixed at a predetermined position of the core material 5 by fitting the protrusion 51 of the core material 5 into the groove (glass-rich part 30). As a shape of the groove, a shape to prevent rotation of the dry friction material 1 to the core material 5 is suitable. It may be formed in a radial manner or an arciform manner.

In the dry friction material of each of the above-described embodiments, the content of the glass fibers at the fixed part of the dry friction material 1 to the core material 5, for example, at the glass-rich part 30 or the glass-rich part 40, is higher than the content of the glass fibers of the rubber-rich part 31 or the rubber-rich part 41 of the part other than the fixed part. Moreover, the content of the compounded rubber of the rubber-rich part 31 of the part other than the fixed part is higher than the content of the compounded rubber of the fixed part such as the glass-rich part 30 or the glass-rich part 40. Thereby, for example, strength or stiffness of the glass-rich part 30 or the glass-rich part 40 to be subjected to the hole boring can be significantly improved. Consequently, simple caulking assembly can be applied without cracking or chipping in the hole boring for the glass-rich part 30 or the glass-rich part 40. Thus, production costs can be reduced. In addition, the content of the compounded rubber at the part other than the fixed part such as the glass-rich part 30 or the glass-rich part 40 is higher than the content of the compounded rubber at the fixed part such as the rubber-rich part 31 or the rubber-rich part 41. Thus, the same action can be achieved at a position other than the fixed part as in the fixed part, so that the dry friction material 1 can be mounted in a stable condition.

In the dry friction material of each of the above-described embodiments, the content of the glass fibers at the fixed part of the dry friction material 1 with the core material 5 such as the glass-rich part 30 or the glass-rich part 40 is higher than the content of the glass fibers at the part other than the fixed part such as the rubber-rich part 31 or the rubber-rich part 41. Moreover, the content of the glass fibers at the bored part to be subjected to the hole boring is higher than the content of the glass fibers at the part other than the bored part. Thus, the content of the glass fibers at the bored part of the bored hole 2 is higher than the content of the glass fibers at the part other than the bored part. Thereby, simple caulking assembly can be applied without generating a cracking, a chipping or the like by the hole boring for the bored hole 2, so that production costs can be reduced.

In the dry friction material of each of the above-described embodiments, the content of the glass fibers of the glass-rich part 30 or the glass-rich part 40 to be subjected to the hole boring is within the range of 1.2 times to 4 times of the content of the glass fibers at the part other than the glass-rich part 30 or the glass-rich part 40. Thereby, in case the content of the glass fibers on the whole dry friction material 1 is set small, the strength and stiffness of the glass-rich part 30 or the glass-rich part 40 to be subjected to the hole boring can be more certainly improved significantly.

In the dry friction material of each of the above-described embodiments, the content of the bored hole 2 of the glass fibers at the glass-rich part 30 or the glass-rich part 40 to be subjected to the hole boring is within the range of 22 percent by weight to 40 percent by weight. Thereby, it prevents more certainly a situation where a failure in the hole boring such as a cracking and a chipping occurs at the bored part to be subjected to the hole boring. In particular, the content of the glass fibers at the bored part to be subjected to the hole boring is more preferably within the range of 24 percent by weight to 36 percent by weight, since it prevents still more certainly a situation where the failure in the hole boring such as the cracking or the chipping occurs at the bored part to be subjected to the hole boring.

In each of the above-described embodiments, the method for manufacturing the dry friction material comprises the resin impregnation step for impregnating the glass roving made by bundling the glass fibers 3 with the impregnation liquid containing the thermosetting resin to form the resin-impregnated string, the rubber adhering step for adhering the compounded rubber 4 to the resin-impregnated string to form the compounding material, the winding step (preliminary shaping step) for forming the wound product (preliminary shaped product) while winding up the compounding material into the circular shape, and the shaping step for shaping the wound product. In the shaping step, the glass fibers 3 of the fixed part or the part other than the fixed part is moved in one direction at the same time with the shaping to increase the content of the glass fibers or the content of the compounded rubber of the fixed part.

Thereby, for example, in case the caulking assembly is used for fixing to the core material 5, the content of the glass fibers at the bored part to be subjected to the hole boring significantly increase, so that the strength and stiffness are improved. Thus, the hole boring can be applied without generating a cracking, a chipping or the like by the hole boring as in the conventional dry friction material, so that simple caulking assembly can be performed. Thereby, production costs can be reduced.

Accordingly, the content of the glass fibers 3 on the whole dry friction material 1 can be maintained low, and the hole boring for caulking assembly can be applied with high strength and high stiffness at the bored part. On the other hand, in case caulking assembly is not applied, the friction with the core material increases by increasing the content of the compounded rubber at the fixed part. Thus, fixing to the core material 5 becomes easier. Thereby, a processing for fixing is not required.

In the embodiment of the present invention, the glass roving made by bundling the glass fibers 3 is used and preliminary shaped into the circular shape by winding. However, the glass fibers 3 are not limited to the glass roving. For example, a glass cloth or the like impregnated with an impregnation liquid may be also used. In this case, a compounded rubber is adhered to the impregnated glass cloth or the like to make a compounding material. Then, the above-described shaping step may be conducted after forming the compounding material into a circular shape by preliminary shaping.

In the method for manufacturing the dry friction material of each of the above-described embodiments, the shaping step is the press-shaping step wherein the wound product is press-shaped with the press die 20 by applying a higher pressure to the fixed part or the part other than the fixed part than the part other than the fixed part or the fixed part. Thereby, the compounded rubber 4 in the compounding material is pushed out to the part other than the fixed part or to the fixed part from the fixed part or from the part other than the fixed part by the press-shaping at a high pressure. Consequently, the content of the glass fibers or the content of the compounded rubber of the fixed part increases. Accordingly, with the increase in the content of the glass fibers, the strength and stiffness are improved, so that a failure in the hole boring such as a cracking and a chipping can be prevented from generating. With the increase in the content of the compounded rubber, friction force increases and fixing to the core material 5 becomes easier.

In the press-shaping step of the method for manufacturing the dry friction material of each of the above-described embodiments, as a means of pressing the fixed part or the part other than the fixed part at a higher pressure than the part other than the fixed part or the fixed part, the protruding part composed of the rib 21 protruding toward the shaped body side to correspond to the fixed part or the part other than the fixed part is provided on the upper die 20B of the press die 20. Thereby, the content of the glass fibers or the content of the compounded rubber of the fixed part can be easily increased.

In the method for manufacturing the dry friction material of each of the above-described embodiments, the protrusion height h of the protruding part composed of the rib 21 is within the range of 15% to 35 of the thickness of the shaped body that is press-shaped in the pressing step. Thereby, the content of the glass fibers or the content of the compounded rubber of the fixed part can be more certainly increased to the content that is suitable for required performance.

In the present embodiment, the examples were described on the case wherein the melamine-modified phenolic resin was used as the synthetic resin for glass fiber impregnation. However, other thermosetting resins, including other modified phenolic resin and an epoxy resin, or the like may be also used. In particular, the melamine-modified phenolic resin is preferable as the synthetic resin for glass fiber impregnation as a material of the dry friction material 1, since it is easily obtained and has excellent heat resistance.

In addition, as the height h of the rib 21 as the protruding part of the press die 20, an appropriate protrusion height can be selected depending on a kind of the glass fibers, the synthetic resin for glass fiber impregnation, or the material of the compounded rubber, a compounding ratio thereof or the like. In particular, the protrusion height h of the protruding part is preferably within a range of 15% to 35% of the thickness t2 of the shaped body 1b that is press-shaped in the press-shaping step.

In the practice of the present invention, the present invention is not limited to each of the present embodiments with respect to a composition, a component, blending quantity, a material, a size, a manufacturing method or the like of other parts on the dry friction material and also with respect to other step on the method for manufacturing the dry friction material. In addition, the numeric values described in the present embodiment of the invention do not indicate a critical value and indicate an appropriate value which is suitable for the embodiment. Even if the above numeric values may be changed slightly, the present invention can be practiced as well.

The preferred embodiments described herein are illustrative and not restrictive, the scope of the invention being indicated in the appended claims are intended to be embraced therein.

The invention claimed is:

1. A dry friction material shaped into a flat ring containing glass fibers, a synthetic resin for glass fiber impregnation, and a compounded rubber, wherein the glass fibers are impregnated with the synthetic resin to form resin-impregnated glass fibers, and the compounded rubber adheres to the resin-impregnated glass fibers, wherein the dry friction material comprises a plurality of fixed parts at which the dry friction material is fixed to a core material, and a plurality of non-fixed parts disposed at an area which does not include the fixed part, the non-fixed part being a recessed part of the dry friction material that is formed between the fixed parts and that is not fixed to the core material when the dry friction material is fixed to the core material through the fixed parts, wherein the fixed part and the non-fixed part are disposed side by side in a circumferential direction of the dry friction material, wherein the fixed part has a content rate of the compounded rubber higher than the non-fixed part, while having a content rate of the glass fibers lower than the non-fixed part, and wherein the dry friction material has a friction surface at one side in a thickness direction thereof and a contact surface at another side in the thickness direction, the dry friction material has the contact surface disposed at the fixed part, while having the recessed part as the non-fixed part disposed on the contact surface so as to be opposite to the friction surface of the dry friction material so that the recessed part as the non-fixed part is disposed between the fixed parts at a side of the contact surface, and the contact surface contacts with the core material when the dry friction material is fixed to the core material through the fixed parts, while the recessed part as the non-fixed part forms a hollow space between the dry friction material and the core material when the dry friction material is fixed to the core material through the fixed parts.

2. A dry friction material according to claim 1, wherein the glass fibers and the compounded rubber are moved and unevenly distributed when the dry friction material is formed so as to make the content of the glass fibers and the content of the compounded rubber different at the position of the fixed part and at the position of the non-fixed part.

3. A dry friction material according to claim 1, wherein the fixed part is a protrusion formed at a side of the contact surface of the dry friction material.

4. A dry friction material according to claim 1, wherein the fixed part has a coefficient of static friction at the contact surface with the core material higher than a coefficient of static friction at the friction surface of the dry friction material.

5. A dry friction material according to claim 1, wherein the dry friction material has at least three engagement holes each of which is provided on the fixed part so that the engagement hole is elastically connected with an engagement protrusion provided on the core material.

6. A dry friction material according to claim 1, wherein a coefficient of static friction of the friction surface is within a range of 0.3 to 0.45, and a coefficient of static friction of the contact surface is within a range of 0.55 to 0.7.

7. A dry friction material according to claim 1, wherein the dry friction material has a positioning means consisting of the engagement holes so that the core material and the dry friction material are positioned using an engagement protrusion formed on the core material and an engagement hole formed on the dry friction material.

* * * * *